Feb. 12, 1935.  E. OLDHAM  1,990,916
PROTECTOR FOR BUNG, TAP, CORK HOLES, AND THE LIKE
Filed March 22, 1933
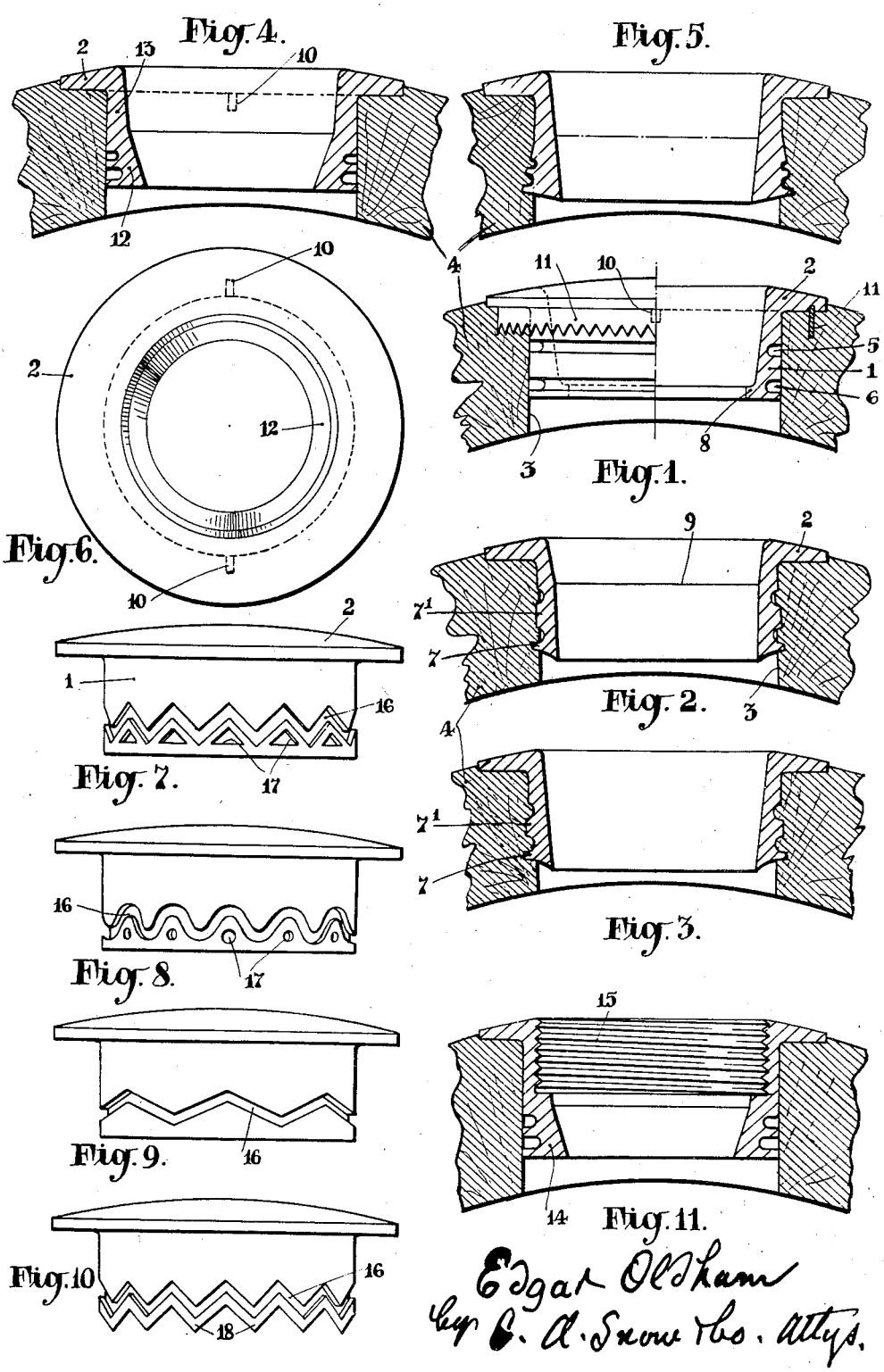

Patented Feb. 12, 1935

1,990,916

UNITED STATES PATENT OFFICE 1,990,916

PROTECTOR FOR BUNG, TAP, CORK HOLES, AND THE LIKE

Edgar Oldham, Burton-on-Trent, England

Application March 22, 1933, Serial No. 662,160
In Great Britain March 24, 1932

4 Claims. (Cl. 217—98)

This invention relates to a protector for bung, tap, cork holes and the like provided in casks, barrels, drums and similar vessels, of the type comprising a metal sleeve which is fixed in the hole.

According to the present improvements, the protector or bush comprises a sleeve, the thickness of the wall of which is greater for a portion of its length so that such portion can be expanded outwardly into the wood forming the wall of the hole. Conveniently the sleeve is shaped so that the exterior surface or portion thereof is gradually expanded into the wall of the hole in the cask or the like from one end inwardly by a rotary expanding tool, whilst at the same time the sleeve is gradually expanded from the said end inwardly to in some cases shape the bore to the required size and taper. The exterior surface of the sleeve is of a corresponding size and shape to the hole in the cask or the like and has one or more grooves therein. The hole in the cask or the like and the exterior surface of the sleeve is preferably cylindrical and so that the surface of the sleeve on each side of the groove or grooves contacts with the wall of the hole before the sleeve is expanded. The grooves may be annular grooves lying in one plane or the groove or grooves may be such that they are directed across the grain of the wood. For instance they may be in a waved or zig-zag form. The sleeve is preferably also formed as a hot stamping so that the wall of the sleeve is of a substantial thickness and so that a considerable body of metal is expanded into the wall of the hole to give a very firm hold which will withstand wooden bungs being knocked therein with great force and also so that the sleeve will form a gas tight fit in the wall of the hole to withstand very great gas pressure.

Referring to the drawing:—

Figure 1 is a sectional elevation showing a bush placed in position in a hole in the barrel and before it is expanded.

Figure 2 is a view of the bush partially expanded into the wall of the hole in the barrel or the like.

Figure 3 is a view showing the bush fully expanded into the wall of the hole.

Figure 4 is a sectional elevation of a form of bush in which only a portion of the wall of the bush is to be expanded.

Figure 5 is a view of the bush shown by Figure 4 expanded into the wall of the hole.

Figure 6 is a plan view of the bush shown by Figure 4.

Figures 7, 8, 9 and 10 are side elevations of the bushes showing various shapes of grooves, and Figure 11 is a sectional elevation of a bush adapted to receive a screwed plug.

According to a convenient embodiment of this invention, the bush comprises a gun metal sleeve 1 having a flange 2 at the outer end. The external shape of the sleeve is substantially of a cylindrical contour before expansion and is adapted to engage a cylindrical hole 3 in the cask stave 4. Two external annular grooves 5 and 6 are provided in the sleeve. The bore of the sleeve has a tapering wall, the taper of which is larger than the taper of the required finished shape in order to allow for expansion. The bottom of the sleeve is also provided with an internal annular projection 8. In order to fix the sleeve in the wall of the hole 3, not only to securely fix a bush in position but also to give a gas and liquid tight joint, the metal of the sleeve is expanded. For this purpose an expanding tool is used which comprises a series of rollers arranged so that they give a surface of revolution having a taper, the shape of which is that of the bore of the sleeve when fixed for use. The tool is inserted in the bush and is rotated and depressed or expanded. The metal of the annular rib 8 is first expanded, as the tool only contacts with this rib. This ensures that the external annular portion 7 below the groove 5 will be firmly and gradually pressed into the wall of the hole 3. When this rib 8 has been completely flattened, the sleeve will gradually be expanded from the bottom as the taper of the bush is greater than that of the tool. Figure 2 shows a bush which has been partially expanded up to the line 9. The continued rotation and depression of the expanding tool further expands the metal until the shape shown by Figure 3 is obtained. The sleeve is therefore very gradually expanded and pressed into the surface of the wood forming the wall of the hole 3, and the annular parts of the sleeve 7 and 7¹ are firmly seated in annular grooves pressed in the wall of the hole 3. The wood also expands into the grooves. In order to prevent the bush turning during the expanding process means are provided to grip the wood; in the example illustrated tits 10 (Figure 6) are provided which are knocked into the wood when the bush is first inserted in the hole. The flange 2 may be arranged to engage a countersink in the stave of the cask, or it may be arranged to bed on the outer surface of the stave, in which latter case the undersurface of the flange is correspondingly curved to that of the cask.

In a further form of the invention, as shown by Figures 4, 5 and 6, only the bottom portion 12 of the sleeve is expanded. In the form illustrated the taper of the bore of the lower portion 12 is greater than the required finished taper, whilst the taper of the upper portion 13 is that of the sleeve when fixed. By expanding only the lower portion of the sleeve distortion or lifting of the flange 2 is prevented. When the lower portion of the sleeve only is expanded the liability of damaging the sleeve is obviated.

According to a further form of the invention as shown by Figure 11, the lower portion 14 of the sleeve only is expanded and the upper portion 15 is screw-threaded for receiving a screwed plug, the arrangement being such that the lower portion can be expanded without detrimentally affecting the screw threads.

The grooves in the exterior of the sleeve may be of any desired shape and may be annular, arranged axially or inclined, or arranged in any other desired manner. As shown by Figures 7, 8, 9 and 10, the grooves 16 are of a zig-zag or waved character. The grain of the wood runs parallel to the stave in which the bung or like hole is formed, and consequently the direction of the grooves 16 is across the gain. The surface of the sleeve on the side of the groove or grooves will therefore compress the wood across the grain and the expansion of the wood into the grooves will also be across the grain. There will therefore be no liability of splitting the wood. In Figures 7 and 8 recesses 17 are provided for the wood to expand thereinto. In the example shown in Figure 10 the bottom of the sleeve is also of a zig-zag or serrated character which provides for the easy expansion into the wall of the hole, whilst moreover the sleeve can be contracted by knocking the projections 18 inwardly and thereby permitting the sleeve to be detached and removed.

The shape of the hole 3 or the sleeve of the bush may be of any shape, the illustration being given by way of example only. In lieu of expanding substantially the full body of the sleeve, local annular portions only may be expanded; for instance one or more annular grooves may be rolled in the sleeve so that external ribs are pressed into the wall of the hole.

Additional sealing means, washers or rings may be combined with the sleeve. For instance the projection 7 aforedescribed may have a channel in the external wall into which a sealing ring is placed so that when the projection is expanded the sealing ring will be tightly pressed into the wall of the hole.

As the bush can be formed to any desired shape, for instance, by its production as a hot stamping, the shape of the flange 2 can be such that it would bed on or coincide with any shaped surface, flat or curved.

Sealing means may be combined with this flange. For instance a sealing washer may be placed under a flange, or again the flange 2 may be provided with a ring 11 which is adapted to pierce the wall of the cask or the like, and such piercing ring may be corrugated and have an edge for piercing the wood. The corrugated ring 11 may be formed of steel, the lower edge being serrated and the points sharpened. A groove, which may have straight sides or which may be undercut, is provided on the underside of the flange 2 and the ring is soldered, brazed or otherwise fixed therein. When the bush is first placed in position the sealing ring 11 is pressed into the wood.

By this invention a bush is fixed in a hole in the cask or the like without splitting or breaking the texture of the wood. In the usual method whereby the bush is screwed into the hole it is found that, almost without exception, the wood is split and damaged, and not only therefore is the strength and life of the cask reduced but crevices are made for dirt and foreign matter to lodge. The bush constructed according to this invention is fixed in position in a hygienic manner, whilst moreover a very efficient water and gas tight joint is obtained which will withstand high pressures.

I claim:

1. A protector or bush for bung, tap, cork holes or the like for casks, barrels, drums and similar vessels, comprising a metal sleeve the exterior surface of which is cylindrical and of a corresponding size and shape to the hole in the cask or the like and has one or more grooves therein so that a surface of the sleeve on each side of the groove or grooves is in contact with the wall of the hole before the sleeve is expanded and which surface is adapted to be gradually expanded into the wall of the hole in the cask from the bottom upwards by a rotary expanding tool, whilst at the same time enabling the bore of the sleeve to be gradually expanded from the bottom upwards to shape the bore to the required size and taper.

2. A protector or bush for bung, tap, cork holes or the like for casks, barrels, drums and similar vessels, comprising a sleeve the thickness of the wall of which is greater for a portion of its length so that such portion can be expanded outwardly into the wall of the hole, and an annular groove or grooves in the external surface of the sleeve arranged so that the direction of the groove or grooves is inclined to the direction of the grain of the wood forming the wall of the hole in the cask.

3. A protector or bush for bung, tap, cork holes or the like for casks, barrels, drums and similar vessels, comprising a sleeve shaped so that the exterior surface or a portion thereof is adapted to be gradually expanded into the wall of the hole in the cask from one end inwardly by a rotary expanding tool, whilst at the same time enabling the bore of the sleeve or a portion thereof to be gradually expanded from the said end inwardly to shape the bore to the required size and taper, and projections on the wall of the sleeve which grip into the wood of the cask or the like to prevent rotation of the bush.

4. A protector or bush for bung, tap, cork holes or the like for casks, barrels, drums or similar vessels, comprising a metal sleeve the inner end portion of which is of increased thickness, an annular groove or grooves pressed in the wall of the hole during the fixing of the said sleeve, an expanded portion of said portion of increased thickness compressing the wood in the wall of the hole and interlocking in the said annular groove or grooves at a point inwards of the inner end of the hole, and the sleeve having a bore which tapers inwardly and is formed to shape by expanding the sleeve into the wall of the hole in the cask or the like.

EDGAR OLDHAM.